Aug. 12, 1969  B. S. HENDERSON  3,461,412
SOLENOID HAVING TWO-PART SINTERED BODY AND INTEGRAL POLE PIECE
Filed Aug. 1, 1967
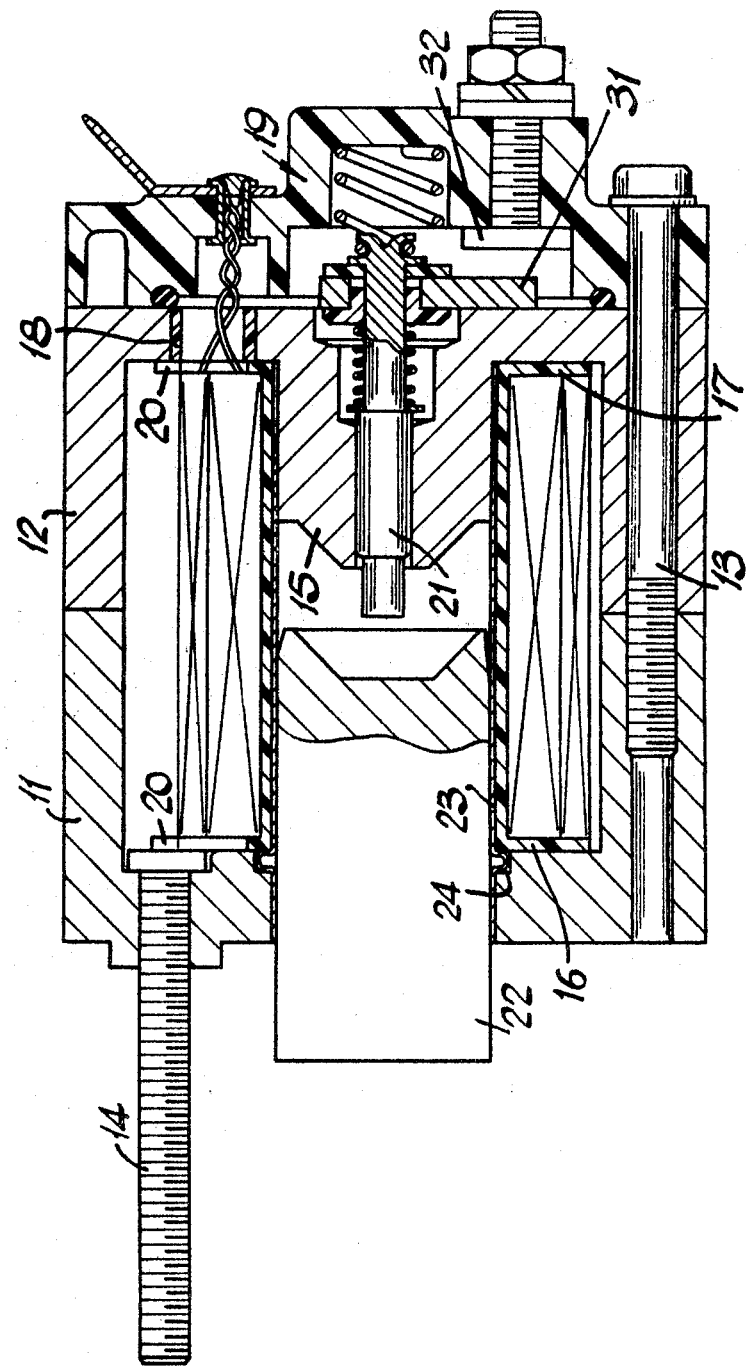

United States Patent Office 3,461,412
Patented Aug. 12, 1969

3,461,412
SOLENOID HAVING TWO-PART SINTERED BODY AND INTEGRAL POLE PIECE
Brian Sydney Henderson, Solihull, England, assignor to Joseph Lucas (Industries) Limited, Birmingham, England
Filed Aug. 1, 1967, Ser. No. 657,645
Claims priority, application Great Britain, Aug. 19, 1966, 37,253/66
Int. Cl. H01f 7/08
U.S. Cl. 335—281        1 Claim

ABSTRACT OF THE DISCLOSURE

A solenoid includes a two-part sintered body carrying the winding assembly within which the solenoid plunger slides, the two parts of the body being interconnected by self-tapping screw extending through plain bores in one part of the body into self-tapped holes in the other part of the body.

---

This invention relates to solenoids.

A solenoid according to the invention includes a two-part sintered body carrying the winding assembly within which the solenoid plunger slides, the two parts of the body which the solenoid plunger s'ides, the two parts of the body being interconnected by self-tapping screws extending through plain bores in one part of the body into self-tapped holes in the other part of the body.

The accompanying drawing is a part-sectional side view of one example of the invention, the section in the upper half of one drawing being at right angles to the section in the lower half of the drawing.

Referring to the drawing, the solenoid includes a two-part sintered body 11, 12, the parts 11, 12 being interconnected by self-tapping screws 13 which extend through plain bores, of larger diameter than the screw 13, in the part 12 and form their own threads in bores of slightly smaller diameter than the screws 13 formed in the part 11. Preferably, sealing compound is placed between the parts 11, 12 before they are interconnected. This form of interconnection is extremely simple as compared with using screw-threaded bolts, which require not only the formation of screw-threaded bores but also the accurate alignment of the parts. The use of self-tapping screws is made possible by forming the body from sintered material, and it will be appreciated that the sintered material is chosen to have suitable magnetic properties.

Non-rotatably secured to the part 11 are a plurality of bolts 14 which extend axially from the part 11 and are used to secure the solenoid in position, the heads of the bolts being located in recesses in the end face of the part 11. Moreover, integrally formed with the part 12 is the solenoid pole 15, which extends axially within the part 12. The integral formation of the pole is possible by virtue of the sintered body, and considerably simplifies the assembly of the solenoid.

The winding assembly of the solenoid includes a cylindrical former engaging the pole and having at its ends annular cheeks 16, 17 which are formed at diametrically opposite positions with radially extending lugs 20 which engage slots in the parts 11, 12 respectively to locate the assembly in the correct angular position relative to the body. The ends of the solenoid winding or (as shown) windings extend through slots in the lug 20 and associated cheek 17 and thence through holes in the end face of the part 12, the holes being lined with insulating washers 18. The windings are connected to a contact assembly 19 which is held in position by the screws 13. Exact details of the assembly 19 will depend on the particular application of the solenoid, and are not important to an understanding of the present invention. However, it will be noted that the assembly includes an operating spindle 21 which extends through an axial bore in the pole 15 for engagement by the solenoid plunger 22, axial movement of the spindle 21 when the plunger 22 is attracted to the pole 15 on energisation of the solenoid serving to close a pair of contacts 31, 32.

The plunger 22 slides within a brass sleeve 23 located within the former. The sleeve 23 is formed with an external circumferential rib 24 adjacent one end, the rib 24 being trapped between the cheek 16 and the end face of the part 11 when the solenoid is assembled. The provision of the rib 24 for securing the sleeve in position facilitates assembly, since no special assembly steps are required for securing the sleeve in place. In addition, a shorter sleeve can be used than in known arrangements, and the risk of rattle is minimised.

Having thus described my invention what I claim as new and desire to secure by Letters Patent is:

1. A solenoid comprising in combination first and second sintered body parts, a contact assembly including a pair of normally open contacts and an operating spindle, a plurality of self-tapping screws securing the contact assembly to the first body part and also securing the first body part to the second body part, an axially extending pole formed integrally with the first body part, an axial bore within said pole and through which said spindle extends, a winding assembly extending axially within the body, one end of the winding assembly surrounding said pole, a non-magnetic guide sleeve having one end trapped between the winding assembly and pole, means fixing the other end of the guide sleeve relative to the second body part, and a plunger slidable within the guide sleeve, axial movement of the plunger when the solenoid is energised moving said spindle axially to close said contacts.

References Cited

UNITED STATES PATENTS

| | | | |
|---|---|---|---|
| 1,229,294 | 6/1917 | Kuntz | 335—255 XR |
| 2,357,959 | 9/1944 | Kouyoumjian | 335—262 XR |
| 3,004,195 | 10/1961 | Peras | 335—262 XR |

FOREIGN PATENTS 912,168    4/1946    France.

GEORGE HARRIS, Primary Examiner

U.S. Cl. X.R.
335—297